United States Patent [19]

Saito

[11] 4,381,559

[45] Apr. 26, 1983

[54] DISC-SHAPED RECORDING MEDIUM REPRODUCING APPARATUS

[75] Inventor: Takashi Saito, Ayase, Japan

[73] Assignee: Victor Company of Japan, Ltd., Yokohama, Japan

[21] Appl. No.: 286,468

[22] Filed: Jul. 24, 1981

[30] Foreign Application Priority Data

Jul. 28, 1980 [JP] Japan .................................. 55-103270

[51] Int. Cl.$^3$ ...................... G11B 23/04; G11B 23/30; G11B 19/00
[52] U.S. Cl. ..................................... 369/77; 369/219; 369/249
[58] Field of Search .................. 369/75, 77, 219, 263, 369/270, 291, 262, 243, 292, 249

[56] References Cited

U.S. PATENT DOCUMENTS 4,316,539  2/1982  Torrington ........................... 369/77
4,352,174  9/1982  Tajima ................................. 369/77

FOREIGN PATENT DOCUMENTS 52-71205  6/1977  Japan ................................... 369/77
2071391  9/1981  United Kingdom ................. 369/77
2082367  3/1982  United Kingdom ................. 369/77

Primary Examiner—Steven L. Stephan
Attorney, Agent, or Firm—Louis Bernat

[57] ABSTRACT

A reproducing apparatus reproduces a disc-shaped recording medium which is accommodated within a case. The reproducing apparatus comprises an inserting opening part through which the case is inserted into the reproducing apparatus, a clamping mechanism for clamping at least one of the disc-shaped recording medium or the lid member, a pickup frame having a reproducing transducer for reproducing the disc-shaped recording medium placed on the turntable, a moving mechanism for moving the pickup frame between a waiting position and a reproducing position, a pair of guide rails provided extending between a position of the inserting opening part and a position at an innermost part of the apparatus, at right and left sides of a moving passage of the case, and allowing a slider for supporting the case to move therealong in response to the inserting and pulling out operation of the case, the guide rail at the side of the pickup frame comprising fixed front and rear guide rail parts respectively fixed at the front end and the rear end of the apparatus in coincidence with a linear line extending in the case inserting direction, and a moving guide rail provided on the pickup frame to move together therewith, and position restricting mechanism for restricting the final position of the moving guide rail part so as to align with the fixed front and rear guide rail parts, when the pickup frame is returned to the waiting position.

6 Claims, 7 Drawing Figures

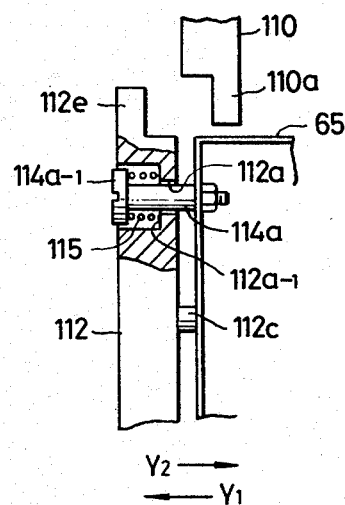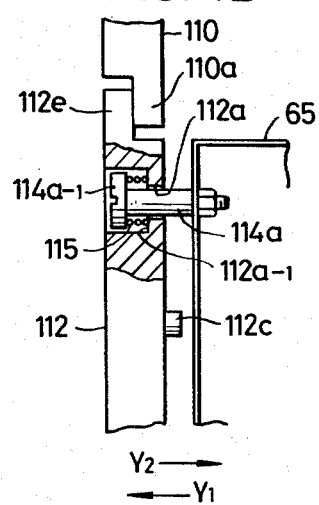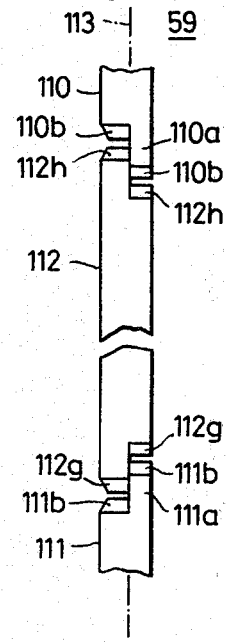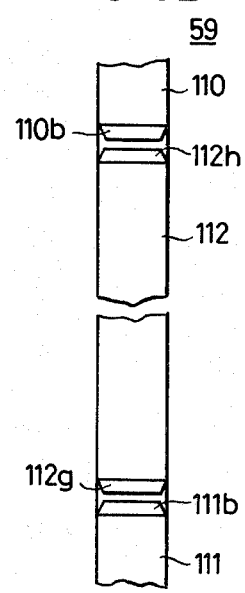

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to an improvement of a disc-shaped recording medium reproducing apparatus having guide rails for guiding sliders which support the case at the left and right ends thereof, to move therealong when the case for recording medium is inserted into and then pulled out from within the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in United States patent application Ser. No. 231,868, filed on Feb. 5, 1981 and entitled "DISC-SHAPED RECORDING MEDIUM REPRODUCING APPARATUS" in which the assignee is the same as that of the present application, a reproducing apparatus was proposed which cooperates with a disc case having a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an inner-most part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, upon loading and unloading of the disc, the disc case is supported at the left and right ends on a front side with respect to inserting direction by corresponding sliders movable along their guide rails and is inserted into and pulled out from the apparatus. The guide rails are disposed at either sides of a disc case moving passage, and must be at a height position where the guide rails are not in a way of a pickup frame. In this connection, the guide rails were disposed at a position higher than the pickup frame, which results in large height dimension of the reproducing apparatus by that much.

In the above stated application entitled "DISC-SHAPED RECORDING MEDIUM REPRODUCING APPARATUS", is disclosed a guide rail structure which enables the reproducing apparatus to be flat shape. This guide rail structure comprises a front end rail part, a center rail, and a rear end rail part which are separated with each other. The front end and rear end rail parts are fixed to the reproducing apparatus, while the center rail part is fixed to the side surface of a pickup frame and moves together with the pickup frame. When the pickup frame is returned to the waiting position, the center rail part is aligned with the other rail parts.

This guide rail structure, however, is not provided with means for aligning the moving center rail part with the front and rear fixed rail parts when the pickup frame is returned to the waiting position, which therefore involves any possibility of occurring of misalignment. When misalignment occurs, the disc case inserting operation is interfered in halfway, whereby the disc loading and unloading operation become impossible.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus which is capable of aligning the moving guide rail with the fixed guide rail part accurately and positively whereupon the pickup frame is returned to the waiting position. According to this apparatus, operation for loading and unloading the disc-shaped recording medium can be effected smoothly.

Further objects and features of the present invention will be apparent from the following detailed description when read in conjunction with the accompanying drawings.

BRIEF DESCRIPTION OF THE DRAWINGS

FIGS. 4A and 4B are plan views, partly cut away, respectively showing how the guide rail operates when the pickup frame is returned to the waiting position, and FIGS. 5A and 5B are plan view and side view, partly cut away, respectively showing the guide rail structure when it is in an aligned state.

DETAILED DESCRIPTION

Figure 1:
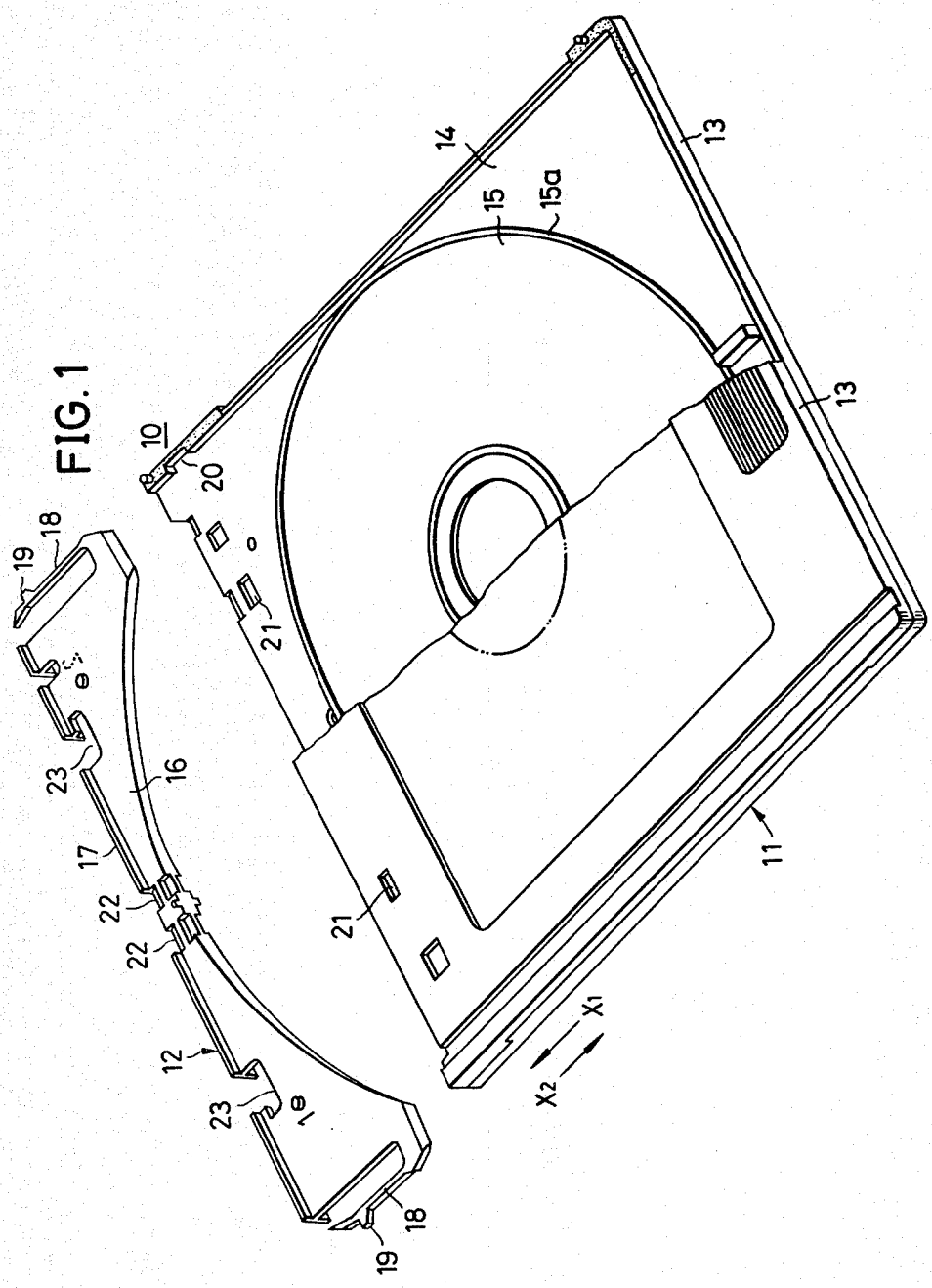
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, a projection 19 of the engaging arm 18 engages into a depression 20, and thus, the lid plate 12 engages with the jacket 11.

Figure 2:
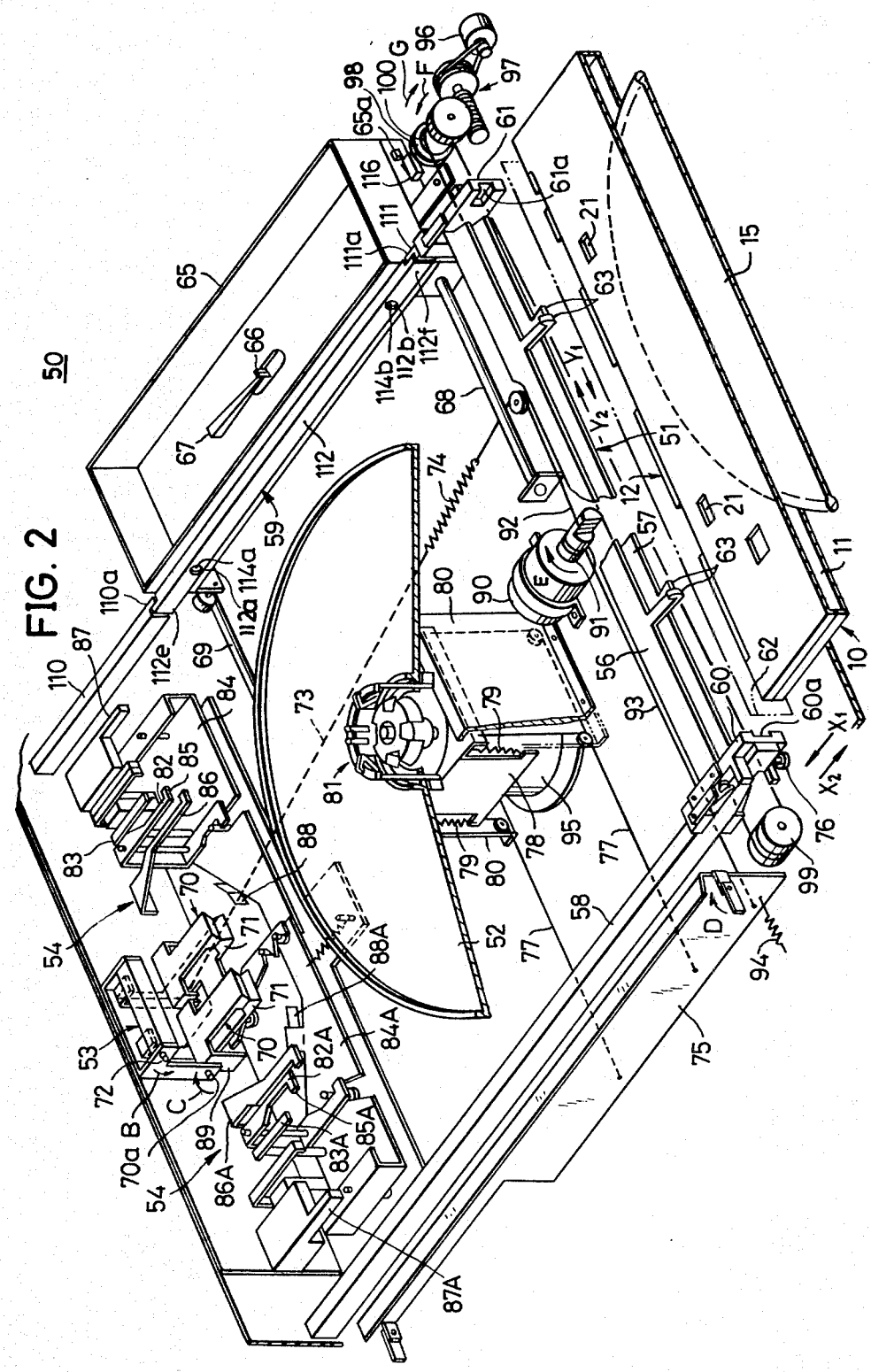
FIG. 2 is a perspective view, showing the inner construction of a disc reproducing apparatus according to the present invention, with a part cut away.

As shown in FIG. 2, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of the arrows Y1 and Y2, and supporting members 60 and 61 (sliders) which are respectively fixedly inserted into guide rails 58 and 59, to support both ends of the respective beams 56 and 57. The jacket opening enlarging mechanism 51 is guided by guide rails 58 and 59, and moves between the innermost part of the reproducing apparatus 50 and a disc case inserting opening 62 provided at the frame of the reproducing apparatus 50, in the directions of the arrows X1 and X2. The guide rail 59 is an essential part of the present invention, and a detailed description of the guide rail 59 will be described hereinafter.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force urging rotation in the upward direction. The upper holding finger 70 is axially supported by a pin 70a.

Upon reproduction of the disc 15, the disc case 10 is inserted through the inserting opening 62 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening.

A sloping surface of a rotary plate 75 is pushed by a roller 76 provided on the slider 60, and the rotary plate 75 rotates in the direction of the arrow D, due to the movement of the jacket opening enlarging mechanism 51. Accompanied by the rotation of the rotary plate 75, a wire 77 is pulled, and a push-up plate 78 is accordingly pulled downwards. Four corners of the push-up plate 78 are suspended and supported by springs 79 with respect to a support plate 80. Due to the downward movement of the push-up plate 78, a disc clamping mechanism 81 moves downwards, to retreat from the insertion passage of the disc case 10.

When the disc case 10 is inserted into the inner-most part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 82 and 82A relatively enter inside L-shaped cutouts 23 of the lid plate 12, and the rim portion 17 accordingly pushes contact fingers 83 and 83A. When the contact fingers 83 and 83A are pushed by the lid plate 12, main levers 84 and 84A respectively rotate to be latched. Furthermore, the locking fingers 82 and 82A rotate in directions so as to mutually separate from each other, and L-shaped parts 85 and 85A provided at the tip ends of the above locking fingers 82 and 82A respectively enter into the innermost parts of the cutouts 23, to lock the lid plate 12. The lid plate 12 is limited of its movement in the direction of the arrow X1 by the contact fingers 83 and 83A, and the lid plate 12 is thus locked and supported at the innermost part of the reproducing apparatus 50 in a state in which the lid plate 12 is placed and supported on supporting fingers 86 and 86A.

Furthermore, engagement releasing members 87 and 87A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 84 and 84A rotate to positions where they are latched, the leaf springs 88 and 88A respectively provided at the bent parts of the main levers push against a vertically extending part 89 of the upper holding finger 70. Hence, a rotational force in the direction of the arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released, and the disc 15 thus becomes locked by the locking fingers 82 and 82A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out to the vicinity of the inserting opening 62, the rotary plate 75 rotationally returns and the disc clamping mechanism 81 moves up to support the center part of the disc 15. Furthermore, when the jacket 11 is pulled out, the disc 15 completely separates from the jacket 11, the jacket opening enlarging mechanism 51 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50. In this state, the disc 15 is supported horizontally at a position above the turntable 52, by the holding fingers 70 and 71 and the disc clamping mechanism 81.

When a play button (not shown) is then pushed, a motor 90 begins to rotate, and a take-up shaft 91 rotates in the direction of arrow E, and hence wires 92 and 93 are thus pulled out from the take-up shaft 91. Accordingly, the holding finger 71 rotates in a direction opposite to the direction of the arrow B, to release the clamping with respect to the disc 15. Further, the rotary plate 75 is rotated in the direction of the arrow D by a tension spring 94, to move the disc clamping mechanism 81 downwards. Hence, the disc 15 moves down and is placed on the turntable 52, and held by the disc clamping mechanism 81. The turntable 52 is rotated by a motor 95. Additionally, a motor 96 starts to rotate a drum 98 in the direction of arrow F by way of a worm gear mechanism 97, which in turn causes a pickup frame moving wire belt 100 strung between the drum 98 and a drum 99 to run. The pickup frame 65 therby moves in the direction of the arrow Y, from the waiting position. This wire belt 100 is connected to the pickup frame 65 in the vicinity of a moving guide rail part 112 which will be described later along the height direction of the pickup frame 65. With this arrangement, no twisting force is acted on the pickup frame 65 when the guide rail alignment takes place as described further below. Thus, the disc 15 is relatively scanned by the reproducing stylus 66, to reproduce the information signal.

Next, an operation in which the disc 15 is recovered from within the reproducing apparatus 50, will now be described.

Upon completion of the reproducing operation, the motor 90 rotates in a direction opposite to the direction as the above after the motor 95 and the turntable 52 stop rotating, and the take-up shaft 91 takes up the wires 92 and 93. Accordingly, the rotary plate 75 rotates in a direction so as to loosen the wire 77, and the disc clamping mechanism 81 thus moves up to push the disc 15 up. Furthermore, the holding finger 71 rotates in the direction of the arrow B, to hold the disc 15.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Next, an embodiment of a guide rail structure which forms an essential part of the reproducing apparatus according to the present invention, will be described in conjunction with FIGS. 3, 4A, 4B, 5A and 5B. In FIGS. 3, 4A, 4B, 5A and 5B, those parts which are the same as those corresponding parts in FIG. 2 are designated by the like reference numerals.

The left-side guide rail 58 is a so-called fixed guide rail which is fixed to the reproducing apparatus body. While the right-side guide rail 59 comprises a pair of fixed guide rail parts 110 and 111, and a single moving guide rail part 112. The fixed guide rail parts 110 and 111 and the moving guide rail part 112 are made of synthetic resin.

The fixed guide rail parts 110 and 111 are respectively disposed at front and rear positions of the reproducing apparatus body and are fixed to the same with the longitudinal direction thereof coinciding with a phantom straight line 113 extending in the case inserting direction.

The moving guide rail part 112 is provided on the side of the pickup frame 65 and moves in the directions of the arrows Y1 and Y2 together with the pickup frame 65.

The moving guide rail 112 is supported, as indicated in FIG. 2 and FIGS. 4A and 4B, with step holes 112a and 112b near the either longitudinal ends thereof being fitted around screw members 114a and 114b fixed by the nuts to the side surface of the frame 65. The moving guide rail 112 is adapted to slide along the screw members 114a and 114b for a short distance in the direction of aparting from the frame 65. A coil spring 115 is fitted around the screw member 114a and interposed between the screw head 114a-1 and a step 112a-1 of the step hole 112a. For the other screw member 114b, a coil spring (not shown) is provided similarly as in the preceding case. An expansion force of this coil spring 115 urges the moving guide rail part 112 to move in the direction of arrow Y2, that is, in the direction of approaching toward the frame 65. Accordingly, when the pickup frame 65 is in a position other than the waiting position thereof, the moving guide rail part 112 are making contact, at its lateral projections 112c and 112d, with the side surface of the pickup frame 65.

The moving guide rail part 112 has steps 112e and 112f respectively formed at longitudinal ends thereof. The fixed guide rail parts 110 and 111 respectively have steps 110a and 111a formed at the end thereof. The steps 110a and 112e together constitute a first contact engagement part, and the steps 111a and 112f together constitute a second contact engagement part. When first and second contact engagement parts are both making face contact, a relationship is established wherein a moving guide rail part 112 is aligned with the pair of fixed guide rail parts 110 and 111 on the phantom straight line 113.

The moving guide rail part 112 is adjusted to be in a horizontal plane.

Both the moving guide rail part 112, and the fixed guide rail parts 110, 111 have bevel faces 112g, 112h, 110b, and 111b formed at their confronting parts. Since the supporting member 61 is of U-shape in cross section, the bevel faces 112g, 112h, 110b, and 111b are formed on the upper, inner and lower surfaces of the guide rail parts 110, 111 and 112.

Next, an operation of the above described construction will now be described.

Figure 3:
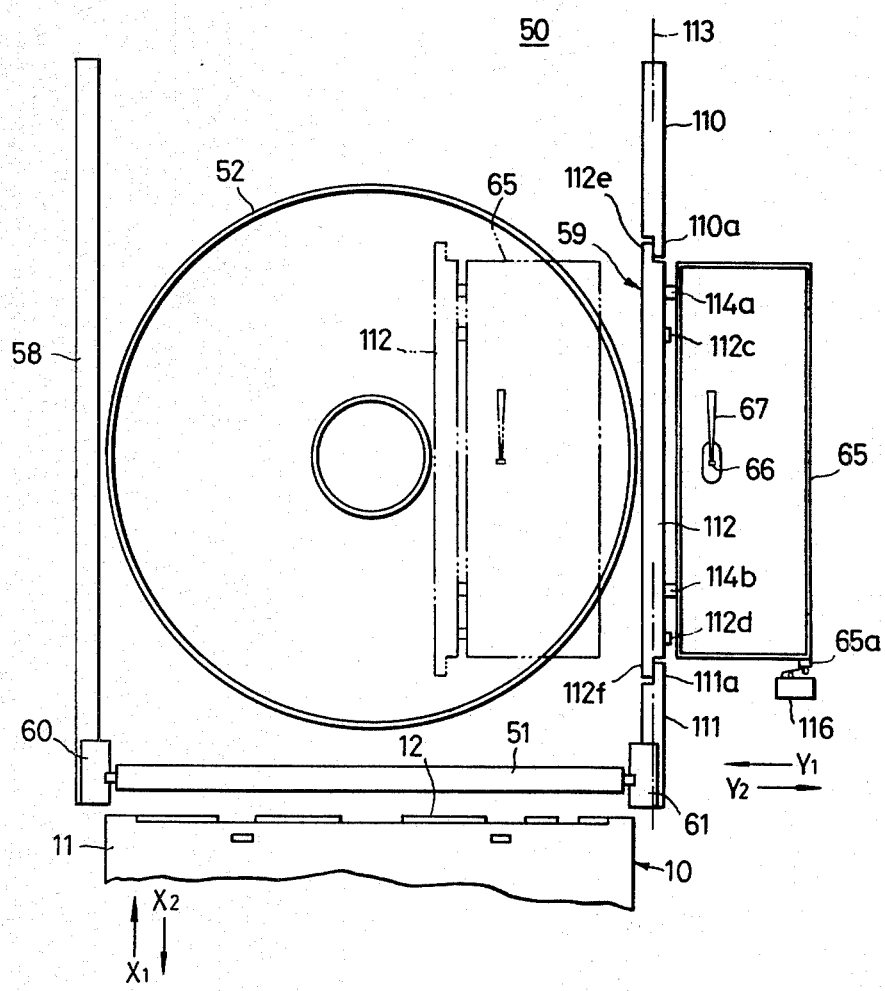
FIG. 3 is a general view showing a guide rail structure which forms an essential part of the reproducing apparatus according to the present invention.

When stop operation is performed during the reproducing mode of operation, the motor 96 rotates the drum 98 in the direction of arrow G, which causes the pickup frame 65 to move from a position indicated by two-dot chain line in FIG. 3 in the direction of arrow Y2 to the waiting position indicated by solid line in the same figure.

When the pickup frame 65 reaches near the waiting position, the steps 112e and 112f at opposite ends of the moving guide rail part 112 respectively brought into contact engagement with the steps 110a and 111a of the fixed guide rail parts 110 and 111. Accordingly, the moving guide rail part 112 is restricted its movement in the direction of arrow Y2. The pickup frame 65, however, further moves in the arrow direction of arrow Y2, independent of the moving guide rail and accompanied by compression deformation of the coil spring 115, until a projection 65a pushes a detection switch 116 to be turned OFF. By the turning OFF of the detection switch 116, a power source circuit for the motor 96 is opened to stop the motor 96, and, in turn, to stop the moving of the pickup frame 65. The pickup frame 65 is locked at this position by the worm gear mechanism 97 which acts as lock mechanism. The detection switch 116 is located so that it is operated after the coil spring 115 undergoes compression deformation.

Accordingly, the guide rail 59 assumes a state, as indicated in FIGS. 2, 3 and 4B, wherein the moving guide rail part 112 is urged to move in the direction of arrow Y2 by a spring force exerted by the compressed coil spring 115, and the steps 112e and 112f respectively make pressing contact with the steps 110a and 111a, whereby the moving guide rail part 112 established positive alignment with the front and rear fixed guide rail parts 111 and 110. A head 114a-1 of the screw members 114a and a head (not shown) of the screw member 114b respectively fully retreat into large-diameter hole of the step holes 112a and 112b.

Even though there exists a deviation in mounting position of the detection switch 116, as long as the detection switch 116 is disposed within a range of dimension of deviation corresponding to the compressively deformed dimension of the coil spring 115, the guide rail 59 always assumes the above described aligned state. In this connection, no high accuracy is required for mounting position of the detection switch 116, which thereby facilitates assembly operation.

Furthermore, even in a case where a mutual relationship between the guide rods 68 and 69, and the phantom straight lines 113 is somewhat offset from the right-angle relationship, the pair of coil springs 115 (one of which is not shown) undergo compressive deformation in a mutually different manner with each other, which therby allows the steps 112e and 112f at opposite ends of the moving guide rail part 112 to make pressed contact with the corresponding steps 110a and 111a. That is, any assembly error around the guide rods 68 and 69, and the pickup frame 65 is compensated by the coil spring 115, and the moving guide rail part 112 is positively aligned with the fixed guide rail parts 110 and 111.

Upon loading (placing) and unloading (recovering) of the disc 15, the disc case 10 (or the empty jacket 11) is inserted and pulled out in the directions of arrow X1 and X2, in a state where either ends at the front side thereof are respectively inserted into and supported by inside depressions 60a and 61a of the supporting members 60 and 61. The supporting members 60 and 61 are respectively guided by the guide rails 58 and 59, and undergo sliding therealong.

Particularly as for moving of the supporting member 61 along the guide rail 59, the supporting member 61 does not strike against the moving guide rail part 112 but smoothly moves from the fixed front end guide rail part 111 to the moving guide rail part 112, and similarly does not strike against the fixed rear end guide rail part 110 but smoothly moves from the moving guide rail part 112 to the guide rail part 110. Furthermore, the supporting member 61 smoothly moves along the moving guide rail part 112 without striking the head 114a-1 of the screw members 114a and 114b.

Furthermore, even though there is dimensional error in the guide rail parts 110, 111, and 112, right-angle steps do not appear at connecting parts by virtue of the bevel faces 110b, 111b, 112g and 112h parts, which, in turn, assures smooth transfer of the supporting member 61 between the guide rail parts 110, 111, and 112.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go in and out of said jacket, and a lid member inserted through said opening of said jacket for closing said opening of said jacket, said reproducing apparatus comprising:

an inserting opening part through which said case is inserted into said reproducing apparatus;
a turntable for rotating said disc-shaped recording medium;
clamping means for clamping at least one of said disc-shaped recording medium or said lid member, provided at the innermost part on the opposite side from said inserting opening part with respect to said turntable;
a pickup frame having a reproducing transducer for reproducing the disc-shaped recording medium placed on said turntable;
moving means for moving said pickup frame between a waiting position and a reproducing position with respect to the disc-shaped recording medium;
a pair of guide rails provided extending between a position of said inserting opening part and a position at an innermost part of said apparatus, at right and left sides of a moving passage of said case, and allowing slider means for supporting said case to move therealong in response to the inserting and pulling out operation of said case, among the pair of guide rail, the guide rail at the side of said pickup frame comprising fixed front and rear guide rail parts respectively fixed at the front end and the rear end of said apparatus in coincidence with a linear line extending in the case inserting direction, and a moving guide rail provided on said pickup frame to move together therewith; and
position restricting means for restricting the final position of said moving guide rail part so as to align with said fixed front and rear guide rail parts, when said pickup frame is returned to the waiting position.

2. A reproducing apparatus as claimed in claim 1 in which said position restricting means comprises steps formed at ends of said front and rear fixed guide rail parts and adapted to engage the opposite end of said moving guide rail when said pickup frame returns to the waiting position, a spring member for urging said moving guide rail part toward said pickup frame, and detection means for detecting said pickup frame when the pickup frame is moved by said moving means over a position where the moving guide rail part strikes against the steps of said front and rear fixed guide rail member and reaches a position where the spring member undergoes resilient deformation, and for stopping operation of said moving means responsive to the above detection.

3. A reproducing apparatus as claimed in claim 1 in which said moving guide rail part has at opposite ends bevel faces, and said fixed guide rails have at ends confronting said moving guide rail bevel faces, said bevel faces sloping in the moving direction of said slider means.

4. A reproducing apparatus as claimed in claim 2 in which said spring member is a coil spring fitted around a screw member and provided below a head of said screw member, said screw member supporting said moving guide rail part on said pickup frame.

5. A reproducing apparatus as claimed in claim 1 in which said moving means has worm gear mechanism which serves as locking means for restricting free moving of said pickup frame after said moving means stopps its operation.

6. A reproducing apparatus as claimed in claim 1 in which said moving means has a wire belt strung to run in the moving direction of said pickup frame, said wire belt is fixed to said pickup frame in the vicinity of said moving guide rail part along the height direction of said pickup frame.

* * * * *